United States Patent
Toyoda et al.

[11] Patent Number: 5,928,800
[45] Date of Patent: Jul. 27, 1999

[54] SLIDE SURFACE CONSTRUCTION

[75] Inventors: Yusuke Toyoda; Masamune Tabata; Kenji Dosaka; Takahiro Gunji; Kenji Hirose, all of Saitama, Japan

[73] Assignee: Honda Giken Kogyo Kabushiki Kaisha, Tokyo, Japan

[21] Appl. No.: 08/626,639

[22] Filed: Apr. 1, 1996

[30] Foreign Application Priority Data

Mar. 31, 1995 [JP] Japan ................................ 7-099592
Mar. 31, 1995 [JP] Japan ................................ 7-100484

[51] Int. Cl.$^6$ .............................. B32B 7/02; B32B 15/01; B32B 15/02
[52] U.S. Cl. ........................ 428/668; 428/679; 428/681; 428/684; 428/687; 428/935
[58] Field of Search ..................... 428/546, 687, 428/548, 668, 679, 681, 684, 935

[56] References Cited

U.S. PATENT DOCUMENTS

| | | |
|---|---|---|
| 5,310,606 | 5/1994 | Fujisawa et al. . |
| 5,324,596 | 6/1994 | Fujisawa et al. . |
| 5,503,942 | 4/1996 | Tabata et al. . |

FOREIGN PATENT DOCUMENTS 6174089  6/1994  Japan .

*Primary Examiner*—Daniel J. Jenkins
*Attorney, Agent, or Firm*—Lyon & Lyon LLP

[57] ABSTRACT

A slide surface construction is formed of an aggregate of metal crystals. The area rate A of hexagonal pyramid-shaped metal crystals in a slide surface of the slide surface construction is in a range of $A \geq 40\%$, and the Co (cobalt) content in the aggregate is in a range of $Co \geq 13\%$ by weight. The metal crystals are preferably Fe (ferrous) crystals. The slide surface takes on an intricate aspect due to the existing of a large number of hexagonal pyramid-shaped metal crystals and hence, has a good oil retention. In addition, the wearing of the hexagonal pyramid-shaped metal crystals is inhibited due to an increase in hardness resulting from the incorporation of Co and therefore, the oil retention is maintained. Thus, the slide surface construction exhibits an excellent seizure resistance.

11 Claims, 15 Drawing Sheets

Example 1

5μm

Example 4

5μm

Example 5

5μm

Example 5

1μm

SLIDE SURFACE CONSTRUCTION

BACKGROUND OF THE INVENTION

1. Field of the Invention

The present invention relates to a slide surface construction and particularly, to a slide surface construction formed of an aggregate of metal crystals and having a high hardness.

2. Description of the Related Art

One example of the conventionally known slide surface constructions of this type is a Fe deposit layer which is formed on an outer peripheral surface of a pipe-like substrate made of a steel in a piston pin for an internal combustion engine for the purpose of enhancing the wear resistance.

However, the known slide surface construction suffers from a problem that under existing circumstances where speed and output of the internal combustion engine have tended to increase, the known slide surface construction is not sufficient in an oil retaining property, namely, oil retention and poor in seizure resistance due to a relatively smooth slide surface thereof.

Therefore, the present applicant has previously developed a slide surface construction including a large number of metal crystals in a slide surface thereof (for example, see Japanese Patent Application Laid-open No.174089/94).

If the slide surface construction is formed in this manner, adjacent pyramid-shaped metal crystals assume mutually biting states and hence, the slide surface takes on an intricate aspect comprising a large number of fine crests, a large number of fine valleys formed between the crests, and a large number of fine swamps formed due to the mutual biting of the crests. Therefore, the slide surface construction has a good oil retention. Thus, the seizure resistance of the slide surface construction is enhanced.

However, as a result of various reviews of the slide surface construction, it has been made clear that the slide surface construction has a relatively low hardness and hence, in order to accommodate a more severe sliding environment, it is necessary to enhance the hardness of the slide surface construction and to inhibit the wearing of the pyramid-shaped metal crystals in the sliding environment to maintain the good oil retention of the slide surface construction.

SUMMARY OF THE INVENTION

It is an object of the present invention to provide a slide surface construction of the above-described type, which has a hardness high enough to meet the above demand.

To achieve the above object, according to the present invention, there is provided a slide surface construction formed of an aggregate of metal crystals, wherein the area rate A of pyramid-shaped metal crystals in a slide surface of the slide surface construction is in a range of $40\% \leq A \leq 100\%$, and the content of cobalt (Co) in the aggregate is in a range of 13% by weight $\leq Co \leq 55\%$ by weight.

If the area rate A of the pyramid-shaped metal crystals is set in such range, the adjacent pyramid-shaped metal crystals assume mutually biting states and hence, the slide surface takes on an intricate aspect comprising a large number of fine crests, a large number of fine valleys formed between the crests, and a large number of fine swamps formed due to the mutual biting of the crests.

If the Co content is set in such range, the hardness of the slide surface construction can be remarkably enhanced, and the friction coefficient $\mu$ can be lowered.

In such slide surface construction, the wearing of the pyramid-shaped metal crystals is inhibited even if the slide surface construction is placed in a severe sliding environment. Therefore, under lubrication, the oil retention of the slide surface construction is maintained satisfactorily, and under non-lubrication, the dispersion of a sliding load is provided by the large number of fine pyramid-shaped metal crystals. Thus, the slide surface construction exhibits an excellent seizure resistance both under lubrication and under non-lubrication.

If the area rate A of the pyramid-shaped metal crystals is lower than 40%, the slide surface tends to be simplified and hence, such area rate A lower than 40% is undesirable. On the other hand, if the Co content is lower than 13% by weight, the metal crystals are liable to be granulated in the slide surface.

It is another object of the present invention to provide a slide surface construction of the above-described type, which has a high oil retention and the like and is capable of exhibiting an excellent sliding characteristic.

To achieve the above object, according to the present invention, there is provided a slide surface construction formed of an aggregate of metal crystals, wherein the area rate A of pyramid-shaped metal crystals in a slide surface is in a range of $40\% \leq A \leq 100\%$, and at least some of the pyramid-shaped metal crystals are heteromorphic pyramid-shaped metal crystals, each of which has at least one fine groove which is formed in at least a portion of at least one ridgeline-correspondence area and which extends in the same direction as the direction of extension of a ridgeline.

If the area rate A of the pyramid-shaped metal crystals is set in such range, the adjacent pyramid-shaped metal crystals assume mutually biting states and hence, the slide surface takes on an intricate aspect comprising a large number of fine crests, a large number of fine valleys formed between the crests, and a large number of fine swamps formed due to the mutual biting of the crests. The intricateness is doubled by the existence of the heteromorphic pyramid-shaped metal crystals each having the fine groove as described above.

Even if such slide surface construction is placed in a severe sliding environment, it exhibits an excellent oil retention under lubrication. On the other hand, under non-lubrication, a sliding load dispersing effect is exhibited by the large number of fine pyramid-shaped metal crystals. Thus, the slide surface construction has an excellent seizure resistance both under lubrication and under non-lubrication.

If the area rate A of the pyramid-shaped metal crystals is lower than 40%, the slide surface tends to be simplified and hence, such area rate A lower than 40% is undesirable.

The above and other objects, features and advantages of the invention will become apparent from the following detailed description of preferred embodiments taken in conjunction with the accompanying drawings.

DETAILED DESCRIPTION OF THE PREFERRED EMBODIMENTS

Figure 1:
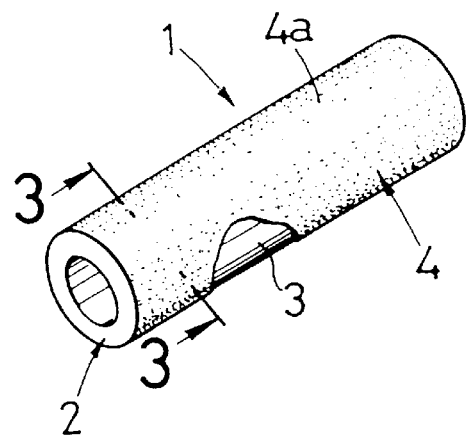
FIG. 1 is a broken-away perspective view of an essential portion of a piston pin.

Referring to FIG. 1, a piston pin 1 for an internal combustion engine includes a pipe-like substrate made of a steel. A lamellar slide surface construction 4 is formed on an outer peripheral surface 3 of the substrate 2 by plating.

Figure 2:
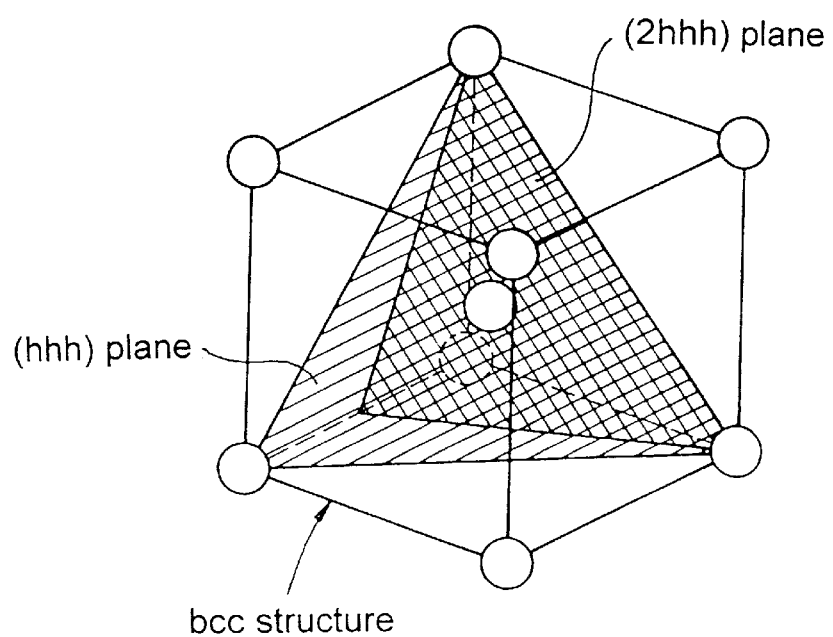
FIG. 2 is a perspective view showing a body-centered cubic structure and its (hhh) plane and (2hhh) plane.
Figure 3:
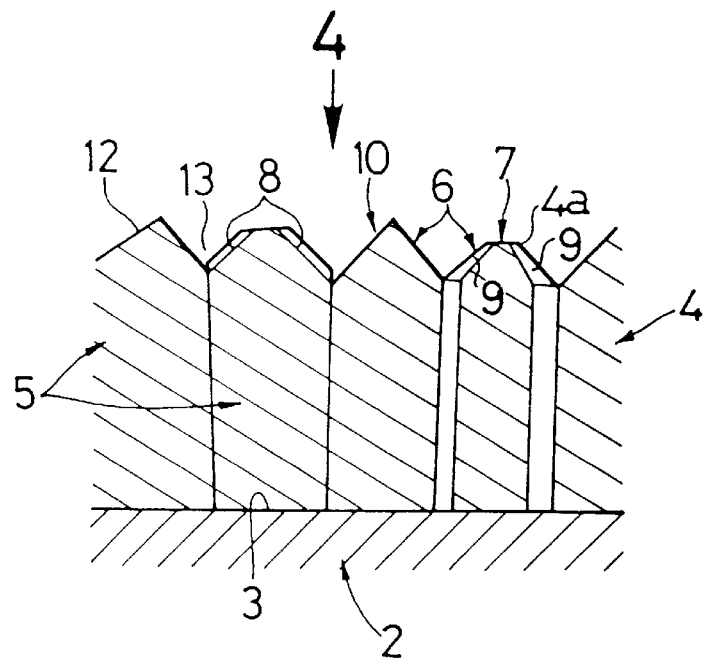
FIG. 3 is an enlarged sectional view taken along a line 3—3 in FIG.1.

The slide surface construction 4 is formed of an aggregate of metal crystals, such as Fe (ferrous)-Co (cobalt) crystals, having a body-centered cubic structure (which will be also referred to as a bcc structure hereinafter) in the embodiment, as shown in FIG. 2. The content of cobalt (Co) in the aggregate is set in a range of 13% by weight $\leq$ Co $\leq$ 55% by weight. The aggregate includes at least one of a large number of (hhh) oriented metal crystals 5 which are grown into a columnar shape from the substrate 2 with their (hhh) planes (by Miller indices) oriented toward a slide surface 4a, or a large number of (2hhh) oriented metal crystals which are grown into a columnar shape from the substrate 2 with their (2hhh) planes (by Miller indices) oriented toward the slide surface 4a.

Figure 4:
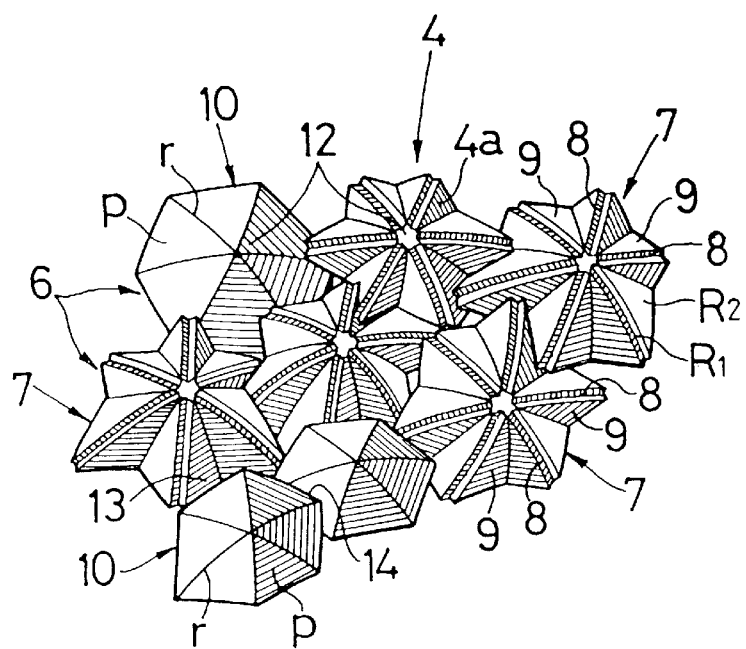
FIG. 4 is a view taken in the direction of an arrow 4 in FIG.3.

When the aggregate of the metal crystals having the bcc structure as described above includes the large number of (hhh) oriented metal crystals 5 with their (hhh) planes (by Miller indices) oriented toward the slide surface 4a, tip ends of the (hhh) oriented metal crystals 5 can be formed into hexagonal pyramid-shaped metal crystals (pyramid-shaped metal crystals) 6 in the slide surface 4a, as shown in FIG. 4.

Figure 5A:
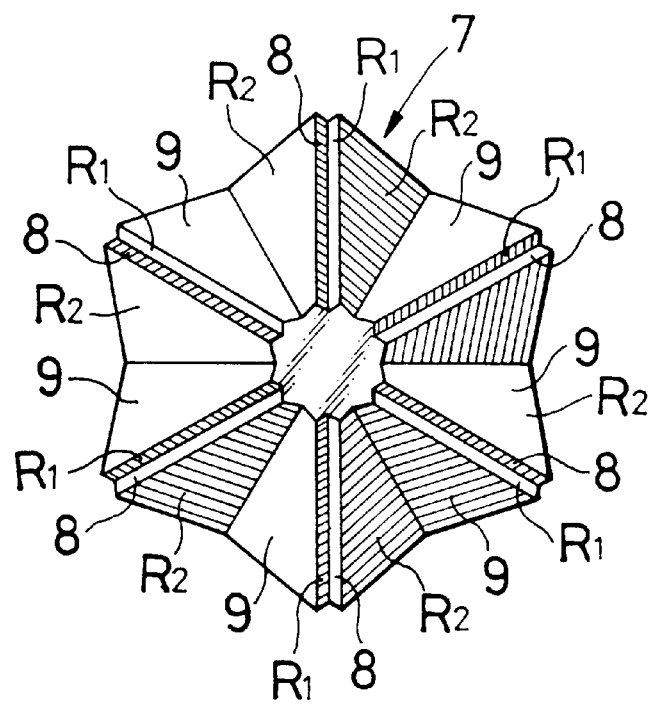
FIG. 5A is a schematic plan view showing a first example of a heteromorphic hexagonal pyramid-shaped metal crystal.

At least some of the hexagonal pyramid-shaped metal crystals 6 are heteromorphic hexagonal pyramid-shaped metal crystals (heteromorphic pyramid-shaped metal crystals) 7, as shown in FIGS. 4 and 5A. Each of the heteromorphic hexagonal pyramid-shaped metal crystals 7 has at least one (one, in the illustrated embodiment) fine groove 8 which extends in the same direction as a direction of extension of a ridgeline over at least a portion, e.g., the substantially entire length of each of at least one (six, in the illustrated embodiment) ridgeline-correspondence areas $R_1$.

The heteromorphic hexagonal pyramid-shaped metal crystal 7 has at least one (six, in the illustrated embodiment) slope-correspondence areas $R_2$ each formed in a V-shaped groove 9 with its opening width gradually decreased from a skirt portion toward an apex.

Figure 5B:
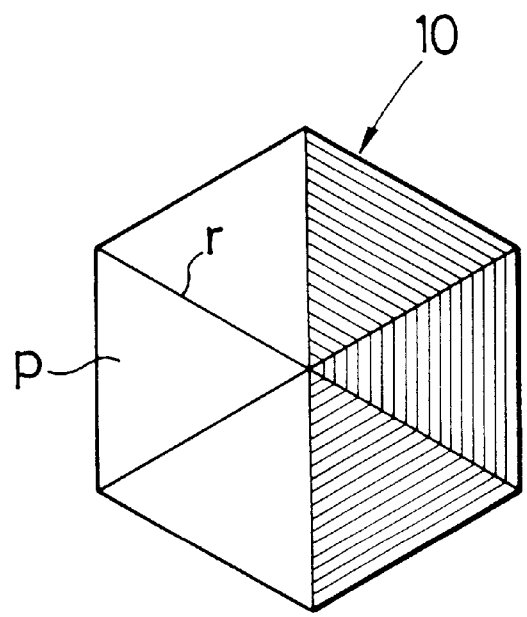
FIG. 5B is a schematic plan view showing one example of a normal hexagonal pyramid-shaped metal crystal.

Normal hexagonal pyramid-shaped metal crystals 10 having no fine grooves 8 in ridgelines r as clearly shown in FIGS. 4 and 5B are included in the hexagonal pyramid-shaped metal crystals 6. In the normal hexagonal pyramid-shaped metal crystal 10, at least one slope p thereof may be likewise formed in a V-shaped groove 9.

Figure 6A:
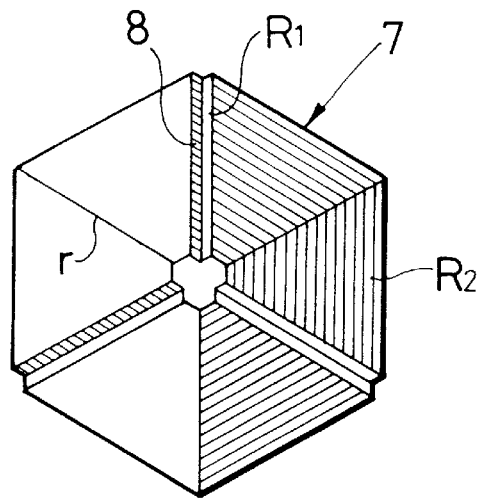
FIGS. 6A, 6B, 6C and 6D show various forms of heteromorphic hexagonal pyramid-shaped metal crystals, with FIG. 6A being a schematic plan view of a second example of the heteromorphic hexagonal pyramid-shaped metal crystal, FIGS. 6B and 6C being schematic side views of third and fourth examples of the heteromorphic hexagonal pyramid-shaped metal crystals, respectively, and FIG. 6D being a sectional view taken along a line 6D—6D in FIG. 6C.
Figure 6C:
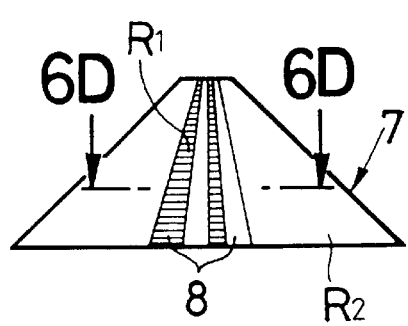
Figure 6B:
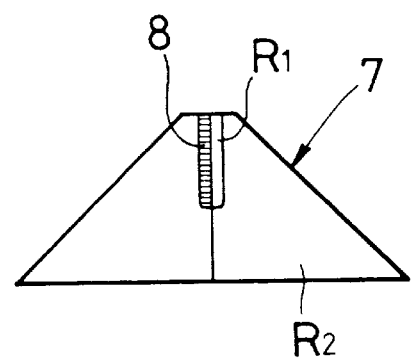
Figure 6D:
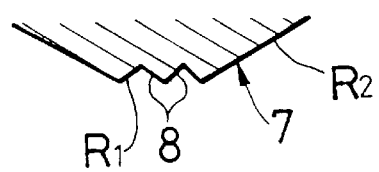

In addition to the above-described form of the heteromorphic hexagonal pyramid-shaped metal crystals 7, various forms are included in the heteromorphic hexagonal pyramid-shaped metal crystals 7, as shown in FIG. 6A to 6D. FIG. 6A shows the form in which ridgelines r and ridgeline-correspondence areas $R_1$ are alternately disposed, and a fine groove 8 exists in each ridgeline-correspondence area $R_1$. FIG. 6B shows the form in which a fine groove 8 exists in a portion of each ridgeline-correspondence area $R_1$. FIG. 6c and 6D show the form in which two fine grooves 8 exist in one ridgeline-correspondence area $R_1$. At least one slope-correspondence area $R_2$ may be formed in a V-shaped groove 9.

Figure 7:
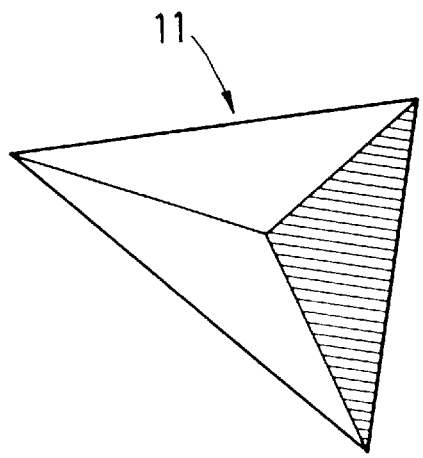
FIG. 7 is a plan view of a normal trigonal pyramid-shaped metal crystal.

Normal trigonal pyramid-shaped metal crystals 11 shown in FIG. 7 and heteromorphic trigonal pyramid-shaped metal crystals (not shown) are included in the trigonal pyramid-shaped metal crystals which are (hhh) oriented metal crystals.

The hexagonal pyramid-shaped metal crystals 6 are small in average grain size and substantially uniform in grain sizes, as compared with the trigonal pyramid-shaped metal crystals. In the hexagonal pyramid-shaped metal crystals 6 and the like, there is an interrelation between the grain size and the height. Therefore, the fact that the grain sizes are substantially uniform, indicates that the heights are also substantially equal to one another.

When the aggregate of the metal crystals having the bcc structure includes a large number of (2hhh) oriented metal crystals with their (2hhh) planes (by Miller indices) oriented toward the slide surface 4a, normal small pyramid-shaped metal crystals and heteromorphic small pyramid-shaped metal crystals are included in the pyramid-shaped metal crystals.

The area rate A of the pyramid-shaped metal crystals such as the normal hexagonal, trigonal and small pyramid-shaped metal crystals and the heteromorphic hexagonal, trigonal and small pyramid-shaped metal crystals in the slide surface 4a is set in a range of 40% $\leq$ A $\leq$ 100%.

If the area rate A is set in such range, for example, adjacent ones of the hexagonal pyramid-shaped metal crystals assume mutually biting states. Thus, the slide surface 4a has an increased surface area, as compared with the slide surface formed of the trigonal pyramid-shaped metal crystals, and takes on a very intricate aspect comprising a large number of extremely fine crests 12, a large number of extremely fine valleys 13 formed between the crests 12, and a large number of extremely fine swamps 14 formed due to the mutual biting of the crests 12. The intricateness is doubled by the existence of the heteromorphic hexagonal pyramid-shaped metal crystals having the fine grooves 8 and the V-shaped grooves 9.

Moreover, the content of cobalt (Co) in the aggregate is set in the above-described range, the hardness of the slide surface construction 4 can be remarkably enhanced, and the friction coefficient $\mu$ can be lowered.

In such slide surface construction 4, the wearing of the hexagonal pyramid-shaped metal crystals 6 is inhibited even if the slide surface construction 4 is placed in a severe sliding environment. Therefore, under lubrication, the oil retention of the slide surface construction 4 is maintained, and under non-lubrication, the dispersion of a sliding load is provided by the hexagonal pyramid-shaped metal crystals 6. Thus, the slide surface construction exhibits an excellent seizure resistance both under lubrication and under non-lubrication.

Further, as a result of uniform fine division of the hexagonal pyramid-shaped metal crystals 6, a local increase in surface pressure can be avoided and a fine division of the sliding load can be achieved. This also lowers the friction coefficient $\mu$ and hence, in cooperation with the presence of cobalt (Co), the slide surface construction 4 exhibits an excellent wear resistance not only under lubrication but also under non-lubrication.

Figure 8:
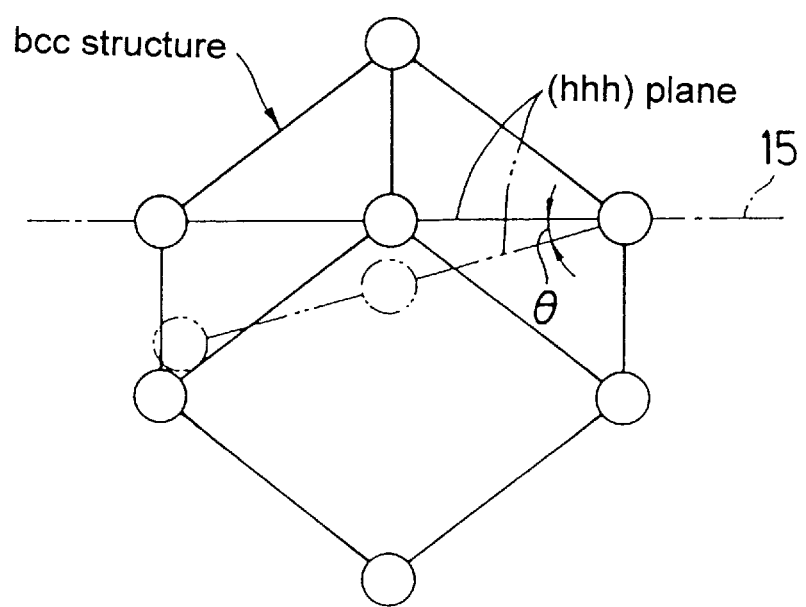
FIG. 8 is a diagram showing the inclination of the (hhh) plane of the body-centered cubic structure.

As shown in FIG. 8, the inclination of the (hhh) plane with respect to a phantom plane 15 along the slide surface 4a appears as the inclination of the hexagonal pyramid-shaped metal crystals 6 and the like and hence, an influence is imparted to the oil retention and the wear resistance of the slide surface construction 4. The inclination angle $\theta$ formed by the (hhh) plane with respect to the phantom plane 15 is set in a range of $0°\leq\theta\leq15°$. In this case, the direction of inclination of the (hhh) plane is not limited. If the inclination angle $\theta$ is larger than 15°, the oil retention and the wear resistance of the slide surface construction 4 are reduced. The inclination angle $\theta$ also applies to the (2hhh) plane.

The slide surface construction 4 is formed of an aggregate of binary alloy crystals, e.g., Fe-Co ordered alloy crystals forming an ordered lattice of CuZn type (L2 type) which is of a CsCl type structure (bcc structure). In this case, it is believed that heteromorphic hexagonal pyramid-shaped Fe-Co ordered alloy crystals are formed by the concentration of ordered lattices of Fe and Co in the ridgeline-correspondence area $R_1$ which is highest in energy during a plating treatment.

In addition to the Fe-Co ordered alloy, examples of the binary alloys are Cu-Zn, Fe-V, Ag-Zn, Ag-Cd, Au-Mn and Cu-Pd ordered alloys and the like.

In the plating treatment for forming the slide surface construction 4, conditions for a plating bath in forming the aggregate of the Fe-Co ordered alloy crystals by an electrolytic plating process are as shown in Table 1.

TABLE 1

| Composition (g/liter) | | | | | Temperature (° C.) |
|---|---|---|---|---|---|
| Ferrous sulfate | Boric acid | Ammonium sulfate | Co-containing additive | ph | |
| 100–400 | 0–50 | 0–200 | ≦450 | 3–6.5 | 10–60 |

Examples of the Co-containing additive which may be used are substances containing cobalt and soluble in water, such as cobalt sulfate, cobalt ammonium sulfate, cobalt chloride, cobalt borofluoride and the like.

A pulse current process is mainly utilized as an energizing process. In the pulse current process, electric current I from a plating power source is controlled to describe a pulse waveform with the passage of time T, so that the electric current I is increased from a minimum current value Imin and reaches a maximum current value Imax, and is then dropped to the minimum current value Imin.

Figure 9:
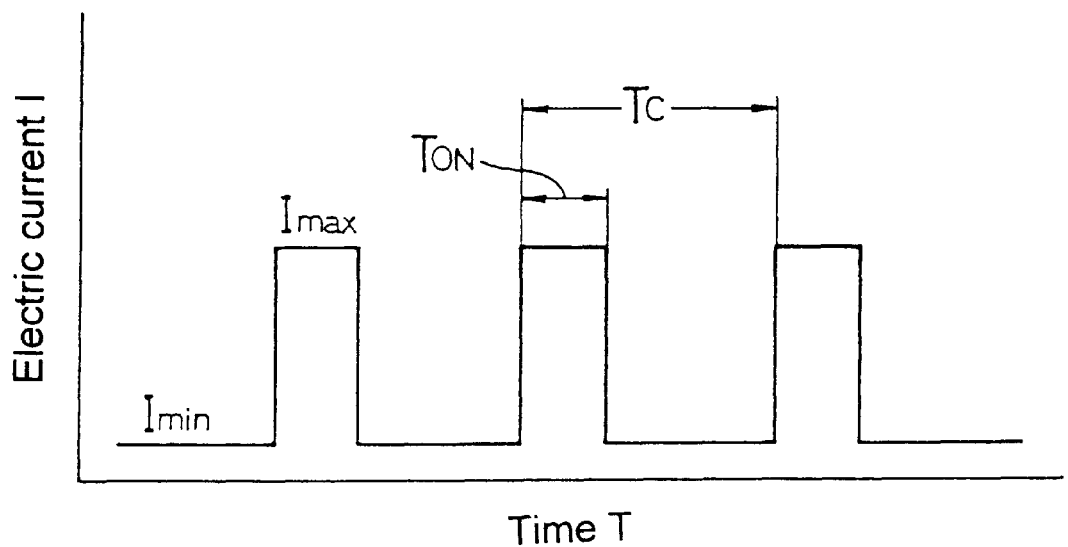
FIG. 9 is a wave form of an output from a power source for an electrolytic plating.

If the energization time period from the start of the increasing of the electric current I to the start of the dropping thereof is represented by $T_{ON}$, and a cycle time period is represented by $T_C$, wherein one cycle is defined as being from the start of the preceding increasing of the electric current to the start of the succeeding increasing thereof, as shown in FIG. 9, the ratio of the energization time period $T_{ON}$ to the cycle time period $T_C$, i,e, the time ratio $T_{ON}/T_C$ is set in a range of $T_{ON}/T_C\leq0.45$. The maximum cathode current density CDmax is set in a range of CDmax$\geq$2 A/dm$^2$, and average cathode current density CDm is set in a range of CDm$\geq$2 A/dm$^2$.

If such a pulse current process is utilized, the ion concentration in the vicinity of a cathode is unformized due to the fact that the electric current flows or does not flow within the plating bath. Thus, the composition of the slide surface construction 4 can be stabilized.

The precipitation, content (which indicates a presence amount) and the like of the (hhh) oriented Fe-Co ordered alloy crystals or the (2hhh) oriented Fe-Co ordered alloy crystals are controlled by changing the plating conditions and the energizing conditions. This control is easy under the utilization of the pulse current process and hence, the slide surface 4a is easily formed into an intended form. In order to accurately control the content of cobalt (Co) in the slide surface construction 4 and to uniformly disperse the cobalt (Co), a liquid replenisher adjusted to the same composition and the same temperature as those of the plating bath is supplied in a predetermined amount between the anode and the cathode during the electrolytic plating. If this supplying is not conducted, a variability in concentration of the Co-containing additive in the plating bath is produced and for this reason, it is difficult to control the content of cobalt (Co) in the slide surface construction 4.

The content of cobalt (Co) in the slide surface construction 4 is controlled basically by the concentration of the Co-containing additive in the plating bath. However, if the composition, pH and temperature of the plating bath are constant, the Co content is controlled by the maximum cathode current density CDmax and the average cathode current density CDm.

In addition to the electrolytic plating, other examples of the plating process are a PVD process, a CVD process, a sputtering process, an ion plating, which are gas-phase plating processes. Conditions for carrying out a Fe-Co alloy plating by a sputtering process are as follows: the Ar gas pressure is 0.2 to 1.0 Pa; the average Ar gas accelerating electric power is D.C. 0.1 to 1.5 kW; and the substrate temperature is 80 to 300° C. In this case, a Fe-Co alloy or a Fe or Co simple metal is used as a cathode target.

Particular examples will be described below.

A plurality of piston pins 1 for an internal combustion engine were produced by subjecting an outer peripheral surface 3 of a pipe-like substrate 2 made of chromemolybdenum steel (JIS SCM420) to an electrolytic plating process to form a slide surface construction 4 formed of an aggregate of Fe-Co ordered alloy crystals and having a thickness of 15 $\mu$m on the outer peripheral surface 3.

Tables 2, 3, 4 and 5 show conditions for the electrolytic plating process for examples 1 to 20, with FIG. 2 corresponding to the examples 1 to 5; Table 3 corresponding to the examples 6 to 10; Table 4 corresponding to the examples 11 to 15; and table 5 corresponding to the examples 16 to 20. The plating time was varied to various values within a range of 5 to 60 minutes in order to set the thickness for the examples 1 to 20 at 15 $\mu$m, as described above. The amount of liquid replenisher supplied was set at 0.5 liter/min.

TABLE 2

| | Plating bath | | | | Pulse current process | | | |
|---|---|---|---|---|---|---|---|---|
| Slide surface construction | Ferrous sulfate (g/liter) | Cobalt sulfate (g/liter) | pH | Temperature (°C.) | CDmax (A/dm$^2$) | CDm (A/dm$^2$) | $T_{ON}T_C$ | $T_{ON}$ (msec) |
| Example 1 | 400 | 100 | 6 | 50 | 10 | 2 | 0.2 | 2 |
| Example 2 | | 100 | | | 15 | 3 | | |
| Example 3 | | 150 | | | 15 | 3 | | |
| Example 4 | | 200 | | | 20 | 4 | | |
| Example 5 | | 300 | | | 25 | 5 | | |

TABLE 3

| | Plating bath | | | | Pulse current process | | | |
|---|---|---|---|---|---|---|---|---|
| Slide surface construction | Ferrous sulfate (g/liter) | Cobalt sulfate (g/liter) | pH | Temperature (°C.) | CDmax (A/dm$^2$) | CDm (A/dm$^2$) | $T_{ON}T_C$ | $T_{ON}$ (msec) |
| Example 6 | 300 | 100 | 6 | 50 | 10 | 2 | 0.2 | 2 |
| Example 7 | | 100 | | | 15 | 3 | | |
| Example 8 | | 150 | | | 15 | 3 | | |
| Example 9 | | 200 | | | 20 | 4 | | |
| Example 10 | | 300 | | | 25 | 5 | | |

TABLE 4

| | Plating bath | | | | Pulse current process | | | |
|---|---|---|---|---|---|---|---|---|
| Slide surface construction | Ferrous sulfate (g/liter) | Cobalt sulfate (g/liter) | pH | Temperature (°C.) | CDmax (A/dm$^2$) | CDm (A/dm$^2$) | $T_{ON}T_C$ | $T_{ON}$ (msec) |
| Example 11 | 200 | 100 | 6 | 50 | 10 | 2 | 0.2 | 2 |
| Example 12 | | 100 | | | 15 | 3 | | |
| Example 13 | | 150 | | | 15 | 3 | | |
| Example 14 | | 200 | | | 20 | 4 | | |
| Example 15 | | 300 | | | 25 | 5 | | |

TABLE 5

| | Plating bath | | | | Pulse current process | | | |
|---|---|---|---|---|---|---|---|---|
| Slide surface construction | Ferrous sulfate (g/liter) | Cobalt sulfate (g/liter) | pH | Temperature (° C.) | CDmax (A/dm$^2$) | CDm (A/dm$^2$) | $T_{ON}T_C$ | $T_{ON}$ (msec) |
| Example 16 | 100 | 50 | 6 | 50 | 10 | 2 | 0.2 | 2 |
| Example 17 | | 50 | | | 15 | 5 | | |
| Example 18 | | 75 | | | 15 | 3 | | |
| Example 19 | | 100 | | | 20 | 4 | | |
| Example 20 | | 100 | | | 25 | 5 | | |

Table 6 shows the content S of the oriented Fe-Co ordered alloy crystals in the examples 1 to 10, and Table 7 shows the content S of the oriented Fe-Co ordered alloy crystals in the examples 11 to 20.

TABLE 6

| Slide surface construction | Content S (%) of oriented Fe—Co ordered alloy crystals | | | | |
|---|---|---|---|---|---|
| | {110} | {200} | {211} | {310} | {222} |
| Example 1 | 0.5 | 0 | 5.5 | 0 | 94 |
| Example 2 | 1 | 0.5 | 6 | 0 | 92.5 |
| Example 3 | 0.5 | 0 | 9 | 0 | 90.5 |
| Example 4 | 0 | 0.5 | 8.5 | 0 | 91 |
| Example 5 | 0 | 0.4 | 9.2 | 0 | 90.4 |
| Example 6 | 10.5 | 9 | 13.2 | 7 | 60.3 |
| Example 7 | 11.2 | 8.8 | 13.3 | 5.3 | 61.4 |
| Example 8 | 10.9 | 8.7 | 12.6 | 7.1 | 60.7 |
| Example 9 | 11.8 | 10.4 | 11.9 | 5.3 | 60.6 |
| Example 10 | 11.7 | 9.2 | 12.7 | 5.2 | 61.2 |

TABLE 7

| Slide surface construction | Content S (%) of oriented Fe—Co ordered alloy crystals | | | | |
|---|---|---|---|---|---|
| | {110} | {200} | {211} | {310} | {222} |
| Example 11 | 24 | 5.1 | 26.9 | 1.8 | 42.2 |
| Example 12 | 23.1 | 3.5 | 30.1 | 2.5 | 40.8 |
| Example 13 | 24.4 | 0.9 | 28.4 | 4.8 | 41.5 |
| Example 14 | 21.3 | 1.2 | 27.6 | 8.2 | 41.7 |
| Example 15 | 22.5 | 2.8 | 29 | 4.8 | 40.9 |
| Example 16 | 22.3 | 10.5 | 24.2 | 8.2 | 34.8 |
| Example 17 | 21.5 | 11.4 | 23.1 | 10.1 | 33.9 |
| Example 18 | 24.8 | 12.1 | 22.7 | 6 | 34.4 |
| Example 19 | 20.9 | 12.9 | 22.8 | 8.7 | 34.7 |
| Example 20 | 21.8 | 11.8 | 24.5 | 7.7 | 34.2 |

Figure 10:
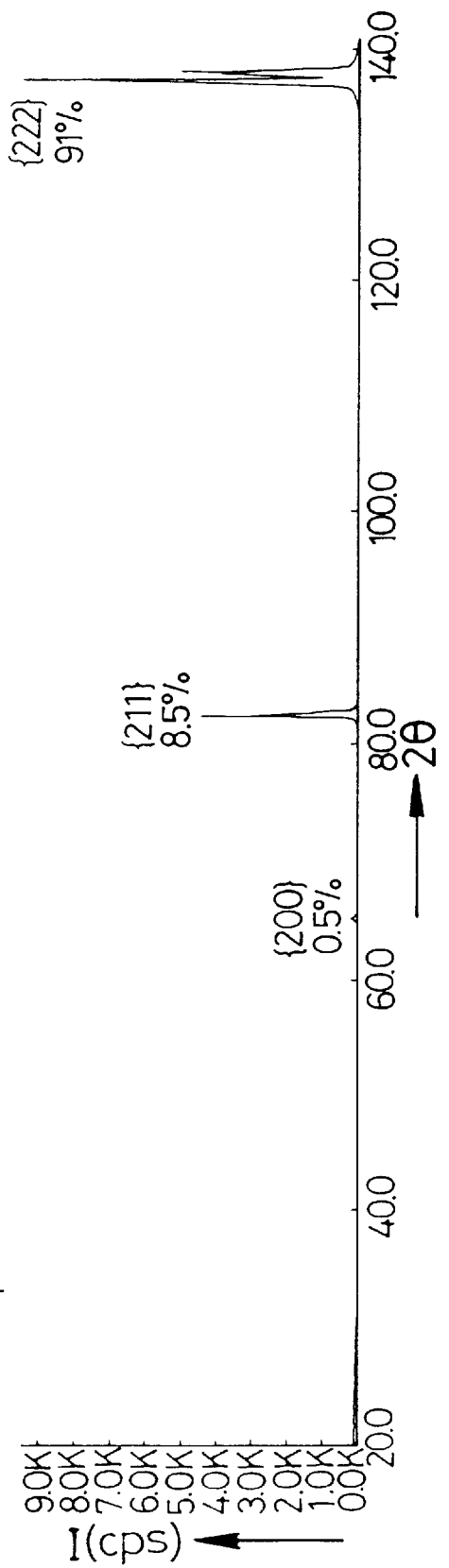
FIG. 10 is an X-ray diffraction pattern for an example 4 of a slide surface construction.

The content S of the oriented Fe-Co ordered alloy crystals was determined from the following equation, based on X-ray diffraction patterns (X-ray was applied in a direction perpendicular to the slide surface) for the examples 1 to 20. The X-ray diffraction pattern for the example 4 is shown as one example in FIG. 10. For example, the {110} oriented alloy crystal means an oriented Fe-Co ordered alloy crystal with its {110} plane oriented toward the slide surface 4a.

{110} Oriented Fe-Co ordered alloy crystal:

$$S_{110}=\{(I_{110}/IA_{110})/T\}\times 100$$

{200} Oriented Fe-Co ordered alloy crystal:

$$S_{200}=\{(I_{200}/IA_{200})/T\}\times 100$$

{211} Oriented Fe-Co ordered alloy crystal:

$$S_{211}=\{(I_{211}/IA_{211})/T\}\times 100$$

{310} Oriented Fe-Co ordered alloy crystal:

$$S_{310}=\{(I_{310}/IA_{310})/T\}\times 100$$

{222} Oriented Fe-Co ordered alloy crystal:

$$S_{222}=\{(I_{222}/IA_{222})/T\}\times 100$$

wherein each of $I_{110}$, $I_{200}$, $I210$, $I310$ and $I_{222}$ is a measurement (cps) of an intensity of X-ray reflected from each crystal plane, and each of $IA_{110}$, $IA_{200}$, $IA_{210}$, $IA_{310}$ and $IA_{222}$ is an intensity ratio of X-rays reflected from crystal planes in an ASTM card, $IA_{110}=100$; $IA_{200}=20$; $IA_{211}=30$; $IA_{310}=12$; and $IA_{222}=6$. Further, $T=(I_{110}/IA_{110})+(I_{200}/IA_{200})+(I_{211}/IA_{211})+(I_{310}/IA_{310})+(I_{222}/IA_{222})$ Tables 8, 9, 10 and 11 show the Co content, the crystal form of the slide surface, the area rate A and grain size of the hexagonal pyramid-shaped Fe-Co ordered alloy crystals in the slide surface, the area rate B of the heteromorphic hexagonal pyramid-shaped Fe-Co ordered alloy crystals in the slide surface, the ratio B/A of the area rate B to the area rate A, and the hardness of a section of the slide surface construction for the examples 1 to 20, with Table 8 corresponding to the examples 1 to 5; Table 9 corresponding to the examples 6 to 10; Table 10 corresponding to the examples 11 to 15; Table 11 corresponding to the examples 16 to 20.

TABLE 8

| Slide surface construction | Co content (% by weight) | Crystal form of slide surface | Hexagonal pyramid-shaped Fe—Co ordered alloy crystals | | Area rate B (%) heteromorphic hexagonal pyramid-shaped Fe—Co ordered alloy crystals | Ratio B/A | Hardness HmV |
|---|---|---|---|---|---|---|---|
| | | | Area rate A (%) | Grain size (μm) | | | |
| Example 1 | 0.5 | Normal hexagonal pyramid-shaped | 100 | 0.5–6 | 0 | 0 | 210 |
| Example 2 | 12 | Normal hexagonal pyramid- | | 0.5–6 | 5 | 0.05 | 220 |
| Example 3 | 13 | shaped and heteromorphic hexagonal | | 0.5–5 | 10 | 0.1 | 380 |
| Example 4 | 26 | pyramid-shaped | | 0.5–3 | 60 | 0.6 | 410 |
| Example 5 | 40 | Heteromorphic hexagonal pyramid-shaped | | 0.5–3 | 100 | 1 | 430 |

TABLE 9

| Slide surface construction | Co content (% by weight) | Crystal form of slide surface | Hexagonal pyramid-shaped Fe—Co ordered alloy crystals | | Area rate B (%) heteromorphic hexagonal pyramid-shaped Fe—Co ordered alloy crystals | Ratio B/A | Hardness HmV |
|---|---|---|---|---|---|---|---|
| | | | Area rate A (%) | Grain size (μm) | | | |
| Example 6 | 0.5 | Normal hexagonal pyramid-shaped and normal small pyramid-shaped | 60 | 0.5–6 | 0 | 0 | 200 |
| Example 7 | 12 | Normal hexagonal pyramid-shaped, heteromorphic hexagonal pyramid-shaped and normal small pyramid-shaped | | 0.5–6 | 3 | 0.05 | 210 |
| Example 8 | 13 | | | 0.5–5 | 6 | 0.1 | 360 |
| Example 9 | 26 | | | 0.5–5 | 36 | 0.6 | 390 |
| Example 10 | 40 | Heteromorphic hexagonal pyramid-shaped and normal small pyramid-shaped | | 0.5–3 | 60 | 1 | 420 |

TABLE 10

| Slide surface construction | Co content (% by weight) | Crystal form of slide surface | Hexagonal pyramid-shaped Fe—Co ordered alloy crystals | | Area rate B (%) heteromorphic hexagonal pyramid-shaped Fe—Co ordered alloy crystals | Ratio B/A | Hardness HmV |
|---|---|---|---|---|---|---|---|
| | | | Area rate A (%) | Grain size (μm) | | | |
| Example 11 | 0.5 | Normal hexagonal pyramid-shaped and normal small pyramid-shaped | 40 | 0.5–6 | 0 | 0 | 200 |
| Example 12 | 12 | Normal hexagonal pyramid-shaped, heteromorphic hexagonal pyramid-shaped and normal small pyramid-shaped | | 0.5–6 | 2 | 0.05 | 220 |
| Example 13 | 13 | | | 0.5–6 | 4 | 0.1 | 350 |
| Example 14 | 26 | | | 0.5–6 | 24 | 0.6 | 390 |
| Example 15 | 40 | Heteromorphic hexagonal pyramid-shaped and normal small pyramid-shaped | | 0.5–6 | 40 | 1 | 420 |

TABLE 11

| Slide surface construction | Co content (% by weight) | Crystal form of slide surface | Hexagonal pyramid-shaped Fe—Co ordered alloy crystals | | Area rate B (%) heteromorphic hexagonal pyramid-shaped Fe—Co ordered alloy crystals | Ratio B/A | Hardness HmV |
|---|---|---|---|---|---|---|---|
| | | | Area rate A (%) | Grain size (μm) | | | |
| Example 16 | 0.5 | Normal hexagonal pyramid- | 35 | 0.5–7 | 0 | 0 | 220 |

TABLE 11-continued

| Slide surface construction | Co content (% by weight) | Crystal form of slide surface | Hexagonal pyramid-shaped Fe—Co ordered alloy crystals | | Area rate B (%) heteromorphic hexagonal pyramid-shaped Fe—Co ordered alloy crystals | Ratio B/A | Hardness HmV |
|---|---|---|---|---|---|---|---|
| | | | Area rate A (%) | Grain size (μm) | | | |
| Example 17 | 12 | shaped and granular Normal hexagonal pyramid-shaped, heteromorphic hexagonal pyramid-shaped and granular | 0.5–7 | 2 | 0.05 | | 230 |
| Example 18 | 13 | | 0.5–7 | 4 | 0.1 | | 340 |
| Example 19 | 26 | | 0.5–7 | 21 | 0.6 | | 350 |
| Example 20 | 40 | Heteromorphic hexagonal pyramid-shaped and granular | 0.5–7 | 35 | 1 | | 360 |

The measurement of the Co content was carried out by a procedure which comprises peeling-off each of the examples 1 to 20 from the substrate 2 and then subjecting each example to an analysis according to a nitroso R salt absorptiometry (JIS G1222).

The area rate A of the hexagonal pyramid-shaped Fe-Co ordered alloy crystals was determined according to an equation, A=(c/b)×100 (%), wherein b represents an area of the slide surface, and c represents an area occupied by all the hexagonal pyramid-shaped Fe-Co ordered alloy crystals in the slide surface. The grain size of the hexagonal pyramid-shaped Fe-Co ordered alloy crystals is an average value of distances between opposed corners on the opposite sides of an apex of each of the hexagonal pyramid-shaped Fe-Co ordered alloy crystals, i.e., of three distances. The area rate B of the heteromorphic hexagonal pyramid-shaped Fe-Co ordered alloy crystals was determined according to an equation, B=(d/b)×100 (%), wherein b represents an area of the slide surface, and d represents an area occupied by all the heteromorphic hexagonal pyramid-shaped Fe-Co ordered alloy crystals in the slide surface.

Figure 11:
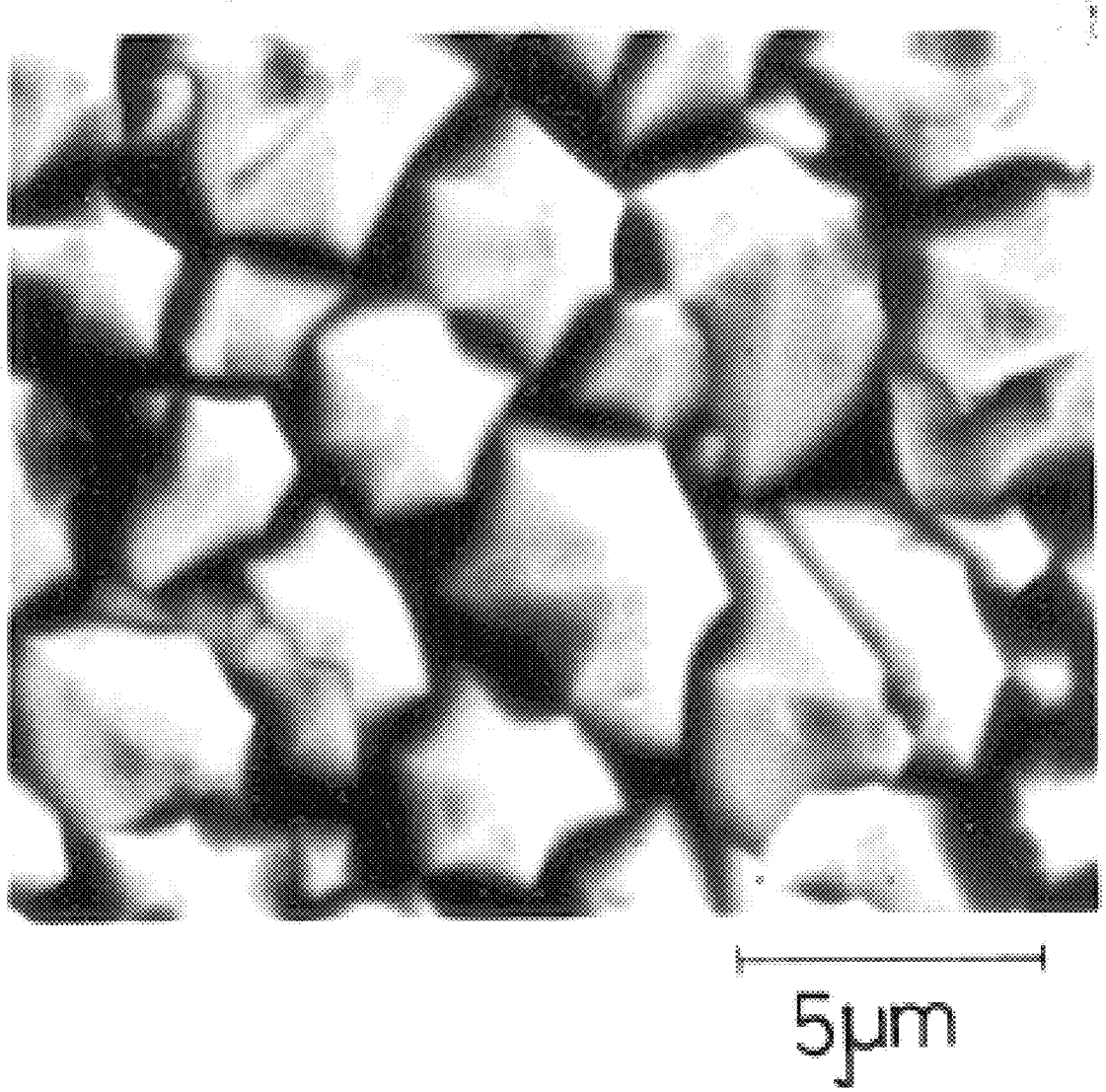
FIG. 11 is a photomicrograph showing the crystal form of an example 1 of a slide surface.

FIG. 11 is a photomicrograph showing the crystal structure of the slide surface in the example 1, wherein a large number of normal hexagonal pyramid-shaped Fe-Co ordered alloy crystals are observed. In this case, the area rate A of the hexagonal pyramid-shaped Fe-Co ordered alloy crystals is equal to 100%, and the area rate B of the heteromorphic hexagonal pyramid-shaped Fe-Co ordered alloy crystals is equal to 0%, as shown in Table 8, and hence, only the normal hexagonal pyramid-shaped Fe-Co ordered alloy crystals exist in the slide surface. Each of the normal hexagonal pyramid-shaped Fe-Co ordered alloy crystals is a {222} oriented Fe-Co ordered alloy crystal with its (hhh) plane, i.e., {222} plane oriented toward the slide surface. The content S of these {222} oriented Fe-Co ordered alloy crystals is equal to 94%, as shown in Table 6.

Figure 12:
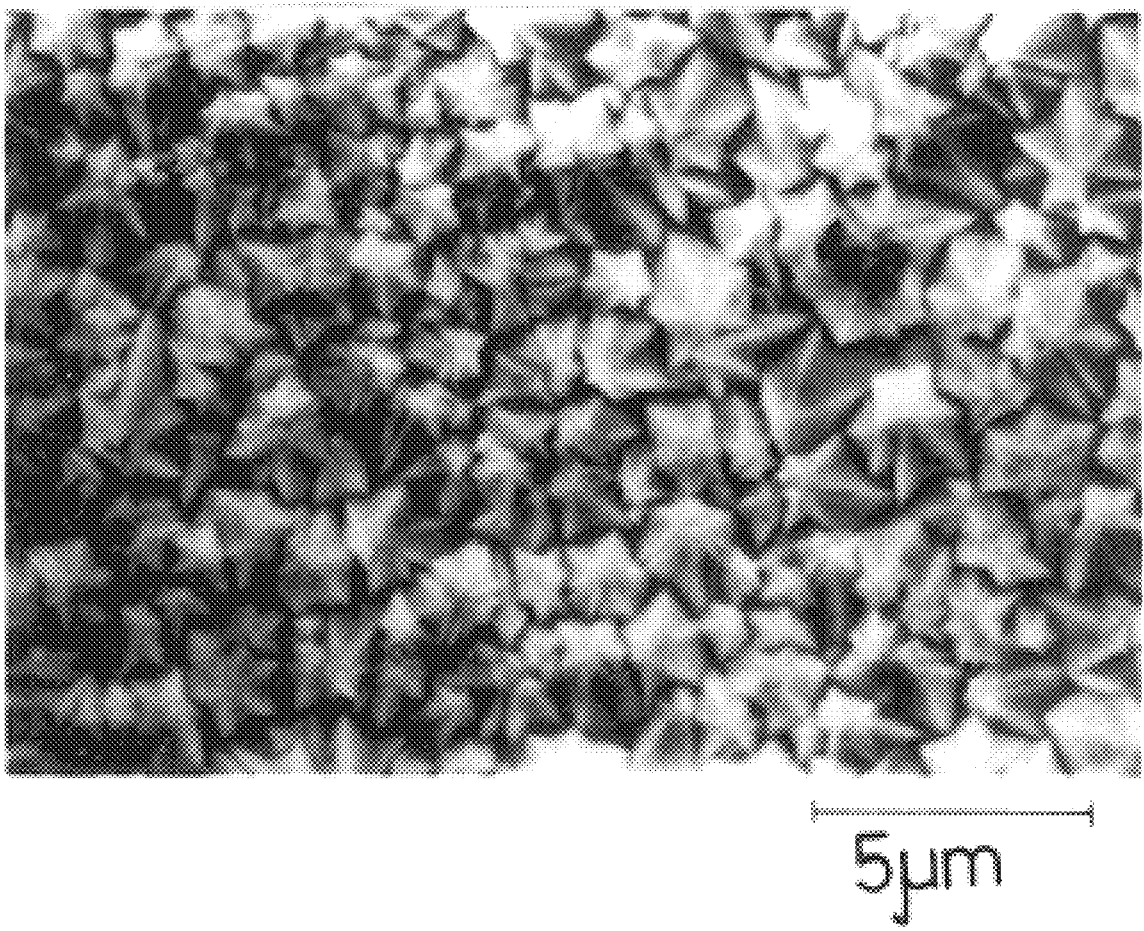
FIG. 12 is a photomicrograph showing the crystal form of an example 4 of the slide surface.

FIG. 12 is a photomicrograph showing the crystal structure of the slide surface in the example 4, wherein a large number of normal hexagonal pyramid-shaped Fe-Co ordered alloy crystals and a large number of heteromorphic hexagonal pyramid-shaped Fe-Co ordered alloy crystals are observed. In this case, the area rate A of the hexagonal pyramid-shaped Fe-Co ordered alloy crystals is equal to 100%, and the area rate B of the heteromorphic hexagonal pyramid-shaped Fe-Co ordered alloy crystals is equal to 60%, as shown in Table 8. Each of the normal and heteromorphic hexagonal pyramid-shaped Fe-Co ordered alloy crystals is likewise a {222} oriented Fe-Co ordered alloy crystal. The content S of these {222} oriented Fe-Co ordered alloy crystals is equal to 91%, as shown in Table 6 and FIG. 10.

Figure 13A:
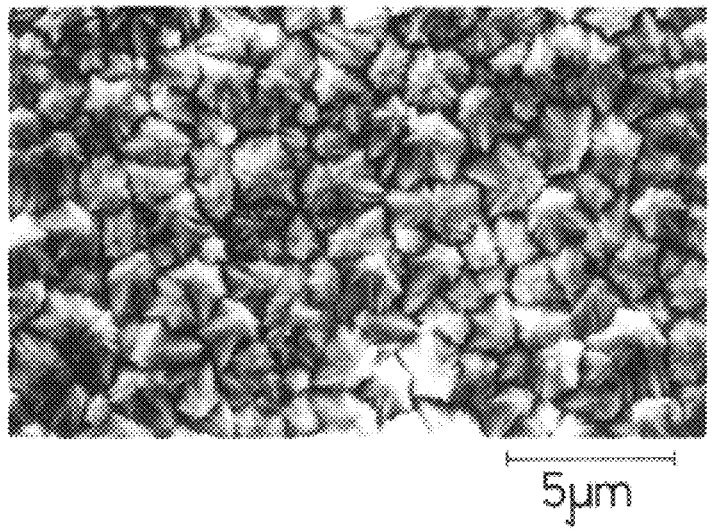
FIG. 13A is a photomicrograph showing the crystal form of an example 5 of the slide surface.
Figure 13B:
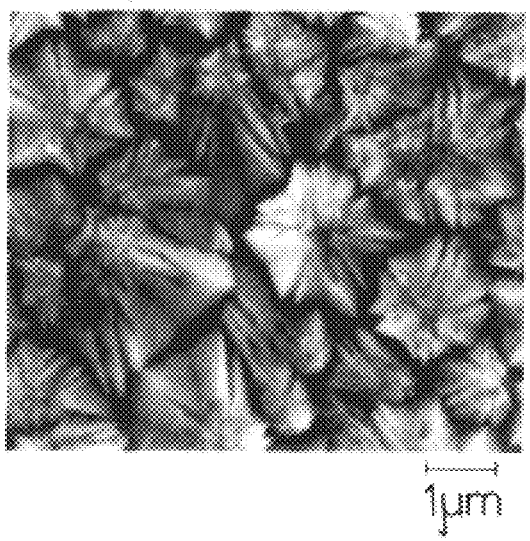
FIG. 13B is an enlarged photomicrograph taken from FIG. 13A.

FIGS. 13A and 13B are photomicrographs showing the crystal structure of the slide surface in the example 5, wherein a large number of heteromorphic hexagonal pyramid-shaped Fe-Co ordered alloy crystals are observed. In this case, the area rate A of the hexagonal pyramid-shaped Fe-Co ordered alloy crystals is equal to 100%, and the area rate B of the heteromorphic hexagonal pyramid-shaped Fe-Co ordered alloy crystals is equal to 100%, as shown in Table 8, and hence, only the heteromorphic hexagonal pyramid-shaped Fe-Co ordered alloy crystals exist in the slide surface. Each of the heteromorphic hexagonal pyramid-shaped Fe-Co ordered alloy crystals is likewise a {222} oriented Fe-Co ordered alloy crystal. The content S of these {222} oriented Fe-Co ordered alloy crystals is equal to 90.4%, as shown in Table 6.

Figure 14:
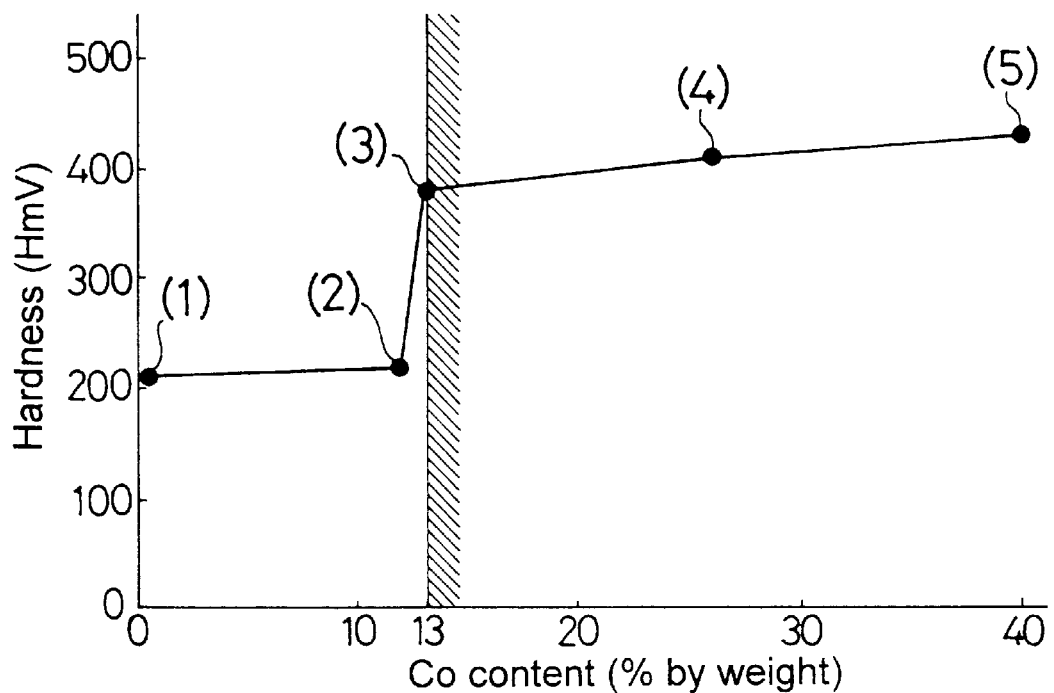
FIG. 14 is a graph illustrating the relationship between the Co content and the hardness.

FIG. 14 is a graph illustrating the relationship between the Co content and the hardness for the examples 1 to 5. In FIG. 14, points (1) to (5) correspond to the examples 1 to 5, respectively. This relationship between the points and the examples applies to Figures which will be described hereinafter. It can be seen from FIG. 14 that if the Co content is set in a range of Co≧13% by weight, the hardness is suddenly increased. The same is true of the examples 6 to 20.

Figure 15:
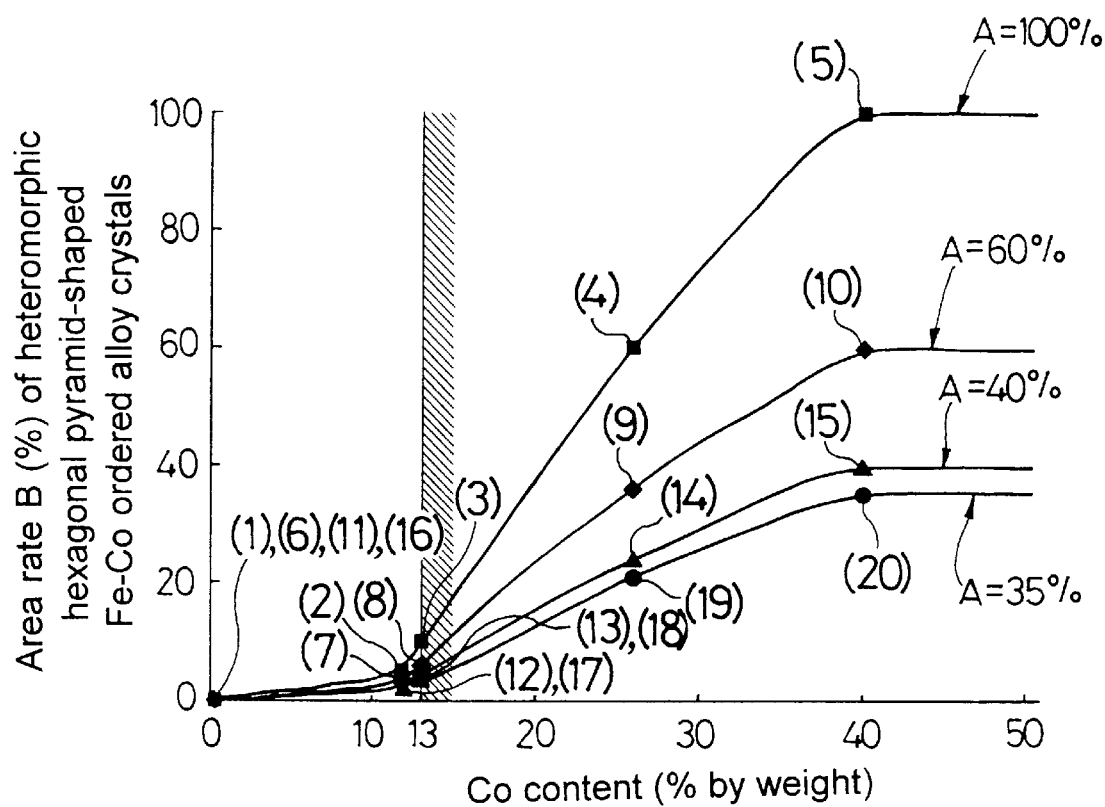
FIG. 15 is a graph illustrating the relationship between the Co content and the area rate B of heteromorphic hexagonal pyramid-shaped Fe-Co ordered alloy crystals.

FIG. 15 shows the relationship between the Co content and the area rate B of the heteromorphic hexagonal pyramid-shaped Fe-Co ordered alloy crystals by the area rate A of the hexagonal pyramid-shaped Fe-Co ordered alloy crystals for the examples 1 to 20. It can be seen from FIG. 15 that when the Co content is in the range of Co≧13% by weight, the area rate B of the heteromorphic hexagonal pyramid-shaped Fe-Co ordered alloy crystals is increased.

Then, chips having the structures of examples 1 to 20 were fabricated and subjected to a sliding test in a chip-on-disk manner under lubrication to measure the seizure generating load and the friction coefficient $\mu$, thereby providing results given in Table 12. Conditions for the sliding test were as follows: the material for the disk was Al-Si (Si 10% by weight) alloy; the peripheral speed of the disk was 15 m/sec; the amount of oil supplied was 0.3 ml/min; the area of the slide surface of the chip was 1 $cm^2$; and the friction coefficient $\mu$ was a value provided when the pressing load on the chip was 250N.

TABLE 12

| Slide surface construction | Seizure generating load (N) | Friction coefficient $\mu$ |
| --- | --- | --- |
| Example 1 | 1200 | 0.01 |
| Example 2 | 1350 | 0.0095 |
| Example 3 | 2100 | 0.006 |
| Example 4 | 2400 | 0.0055 |
| Example 5 | 2550 | 0.005 |
| Example 6 | 1050 | 0.011 |
| Example 7 | 1200 | 0.0105 |
| Example 8 | 1900 | 0.007 |
| Example 9 | 2100 | 0.0065 |
| Example 10 | 2200 | 0.006 |
| Example 11 | 900 | 0.012 |
| Example 12 | 1000 | 0.0115 |
| Example 13 | 1650 | 0.008 |
| Example 14 | 1850 | 0.0075 |
| Example 15 | 1900 | 0.007 |
| Example 16 | 280 | 0.018 |
| Example 17 | 330 | 0.0175 |
| Example 18 | 370 | 0.0173 |
| Example 19 | 400 | 0.017 |
| Example 20 | 430 | 0.017 |

Figure 16:
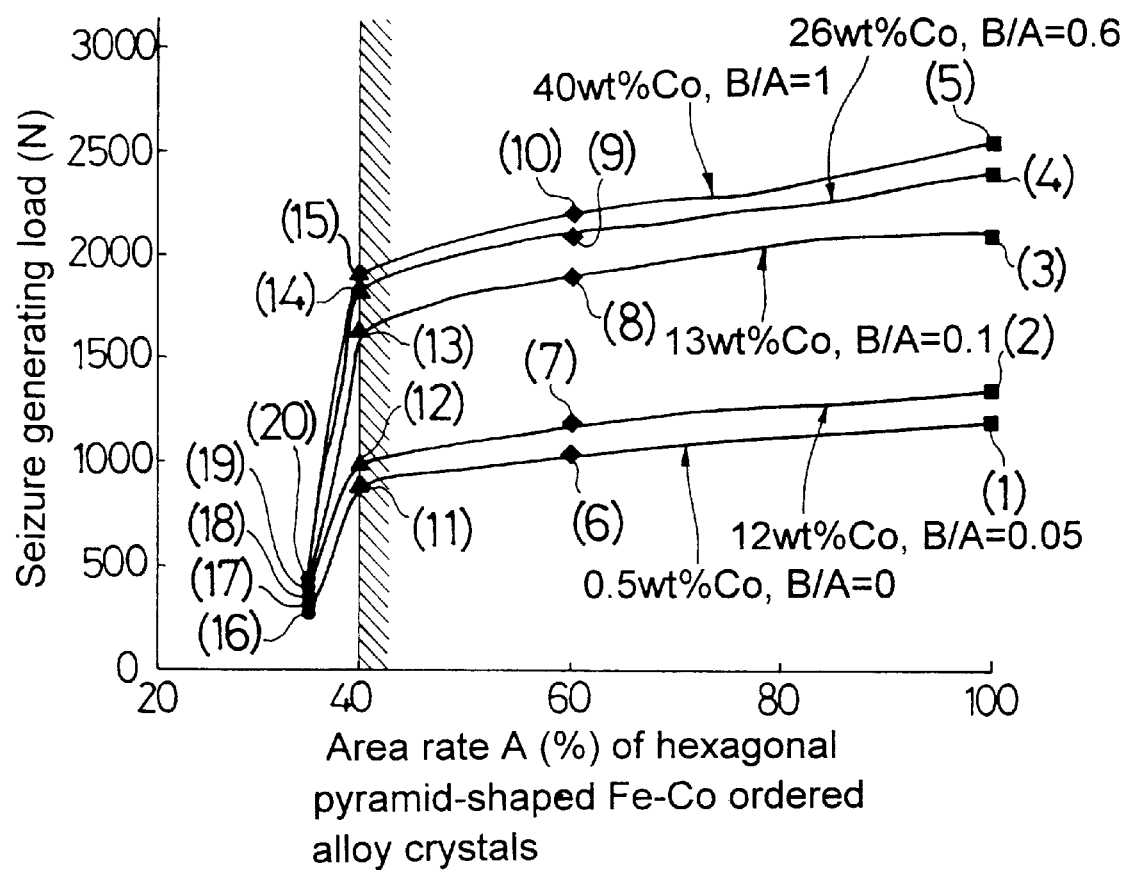
FIG. 16 is a graph illustrating the relationship between the area rate A of hexagonal pyramid-shaped Fe-Co ordered alloy crystals and the seizure generating load.
Figure 17:
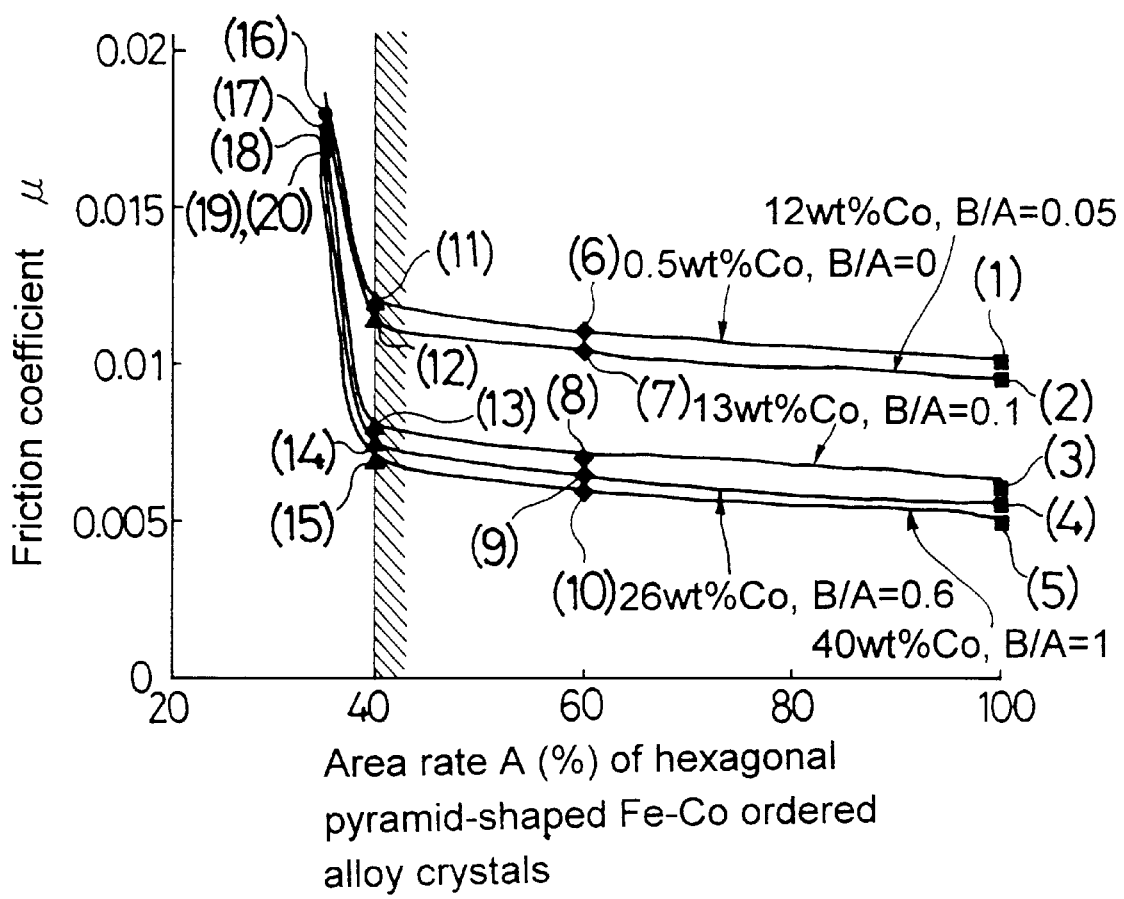
FIG. 17 is a graph illustrating the relationship between the area rate A of hexagonal pyramid-shaped Fe-Co ordered alloy crystals and the friction coefficient $\mu$.

FIG. 16 shows the relationship between the area rate A of the hexagonal pyramid-shaped Fe-Co ordered alloy crystals and the seizure generating load by the Co content and the ratio B/A of the area rate B and the area rate A for the examples 1 to 20. FIG. 17 shows the relationship between the area rate A of the hexagonal pyramid-shaped Fe-Co ordered alloy crystals and the friction coefficient $\mu$ by the Co content and the ratio B/A of the area rate B and the area rate A for the examples 1 to 20.

It can be seen from FIGS. 16 and 17 that the examples 2 to 5, 7 to 10 and 12 to 15 having the area rate A of the pyramid-shaped Fe-Co ordered alloy crystals in the range of $A \geq 40\%$ and including the heteromorphic hexagonal pyramid-shaped Fe-Co ordered alloy crystals are high in seizure generating load and low in friction coefficient $\mu$, as compared with the examples 1, 6, 11, and 16 to 20. Thus, each of the examples 2 to 5, 7 to 10 and 12 to 15 has a good seizure resistance and a good wear resistance. In this case, each of the examples 3 to 5, 8 to 10 and 13 to 15 having the Co content set in the range of $Co \geq 13\%$ by weight and the area rate A in the range of $A \geq 40\%$ and the ratio B/A of the area rate B to the area rate A set in the range of $B/A \geq 0.1$ has remarkably excellent seizure and wear resistances, as compared with the examples 2, 7 and 12 having the ratio B/A smaller than 0.1 and Co content in the range of $Co \geq 13\%$ by weight.

Figure 18:
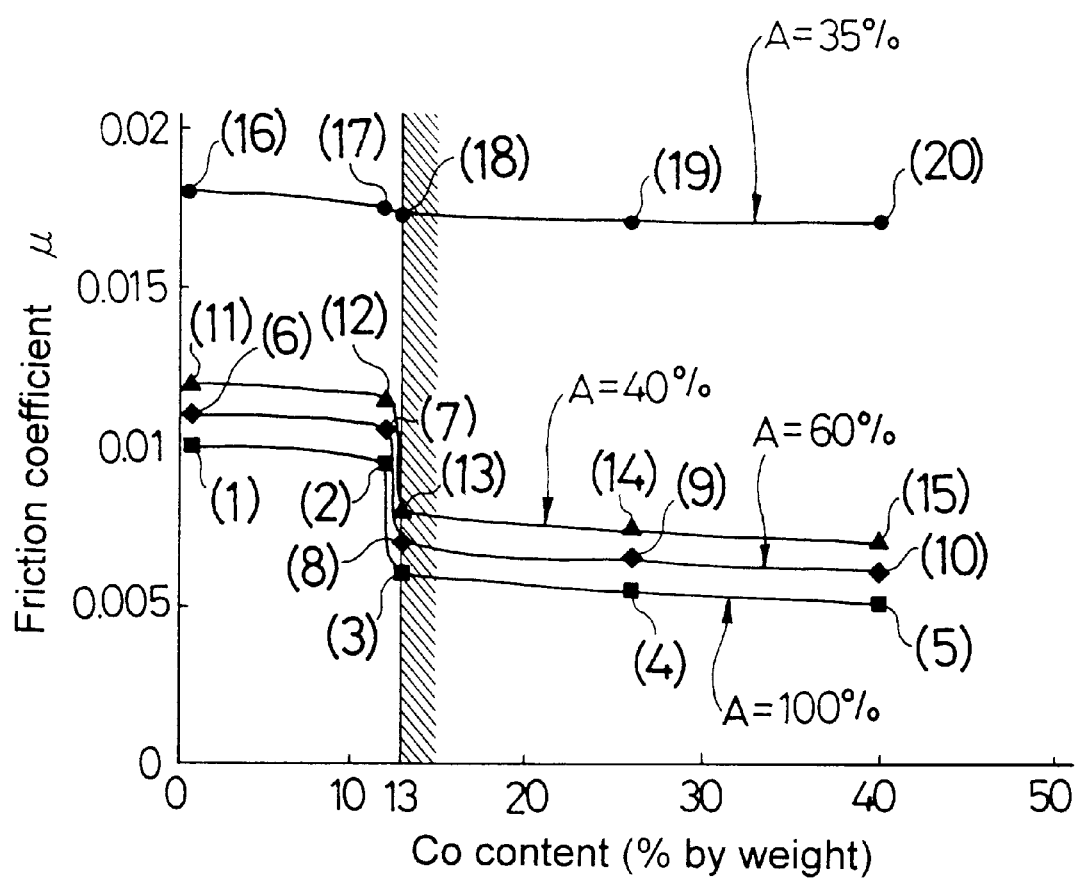
FIG. 18 is a graph illustrating the relationship between the Co content and the friction coefficient $\mu$.

FIG. 18 shows the relationship between the Co content and the friction coefficient $\mu$ by the area rate A for the examples 1 to 20.

As apparent from FIG. 18, the examples 3 to 5, 8 to 10 and 13 to 15 having the area rate A in the range of $A \geq 40\%$ and the Co content in the range of $Co \geq 13\%$ by weight are low in friction coefficient $\mu$, as compared with the examples 1, 2, 6, 8, 11, 12 and 16 to 20 having the area rate A lower than 40% and/or the Co content lower than 13% by weight.

The present invention is not limited to the piston pin and is applicable to various slide members such as a piston, a cam shaft, a piston ring and the like.

What is claimed is:

1. A slide surface construction formed of an aggregate of metal crystals, wherein the area rate A of pyramid-shaped metal crystals in a slide surface of said slide surface construction is in a range of $40\% \leq A \leq 100\%$, and the content of cobalt (Co) in said aggregate is in a range of 13% by weight $\leq Co \leq 55\%$ by weight.

2. A slide surface construction according to claim 1, wherein each of said metal crystals has a body-centered cubic structure, and said pyramid-shaped metal crystals are at least one of (hhh) oriented metal crystals with their (hhh) planes (by Miller indices) oriented toward the slide surface and (2hhh) oriented metal crystals with their (2hhh) planes (by Miller indices) oriented toward the slide surface.

3. A slide surface construction according to claim 1 or 2, wherein each of said metal crystals is a Fe crystal, and each of said pyramid-shaped metal crystals is a hexagonal pyramid-shaped (hhh) oriented Fe crystal with its (hhh) plane (by Miller indices) oriented toward the slide surface.

4. A slide surface construction according to claim 1 or 2, wherein some of said pyramid-shaped metal crystals are heteromorphic pyramid-shaped metal crystals, each of which has at least one fine groove which is formed in at least a portion of at least one ridgeline-correspondence area and which extends in the same direction as a direction of extension of a ridgeline.

5. A slide surface construction according to claim 4, wherein each of said heteromorphic pyramid-shaped metal crystals has at least one slope-correspondence area formed in a V-shaped groove with its opening width gradually decreased from a skirt portion toward an apex.

6. A slide surface construction according to claim 4, wherein the ratio B/A of the area rate B of said heteromorphic pyramid-shaped metal crystals in said slide surface to the area rate A of said pyramid-shaped metal crystals is in a range of $B/A \geq 0.1$.

7. A slide surface construction according to claim 5, wherein the ratio B/A of the area rate B of said heteromorphic pyramid-shaped metal crystals in said slide surface to the area rate A of said pyramid-shaped metal crystals is in a range of $B/A \geq 0.1$.

8. A slide surface construction according to claim 3, wherein some of said pyramid-shaped metal crystals are heteromorphic pyramid-shaped metal crystals, each of which has at least one fine groove which is formed in at least a portion of at least one ridgeline-correspondence area and which extends in the same direction as a direction of extension of a ridgeline.

9. A slide surface construction according to claim 8, wherein each of said heteromorphic pyramid-shaped metal crystals has at least one slope-correspondence area formed in a V-shaped groove with its opening width gradually decreased from a skirt portion toward an apex.

10. A slide surface construction according to claim 8, wherein the ratio B/A of the area rate B of said heteromorphic pyramid-shaped metal crystals in said slide surface to the area rate A of said pyramid-shaped metal crystals is in a range of $B/A \geq 0.1$.

11. A slide surface construction according to claim 9, wherein the ratio B/A of the area rate B of said heteromorphic pyramid-shaped metal crystals in said slide surface to the area rate A of said pyramid-shaped metal crystals is in a range of $B/A \geq 0.1$.

* * * * *